(12) United States Patent
Asakura et al.

(10) Patent No.: US 8,934,205 B2
(45) Date of Patent: Jan. 13, 2015

(54) ESD PROTECTION DEVICE

(75) Inventors: Kensaku Asakura, Tokyo (JP); Shingo Suzuki, Tokyo (JP); Yasuhiro Hirobe, Tokyo (JP)

(73) Assignee: TDK Corporation, Tokyo (JP)

( * ) Notice: Subject to any disclaimer, the term of this patent is extended or adjusted under 35 U.S.C. 154(b) by 49 days.

(21) Appl. No.: 13/816,418

(22) PCT Filed: Sep. 27, 2011

(86) PCT No.: PCT/JP2011/072104
§ 371 (c)(1),
(2), (4) Date: Feb. 11, 2013

(87) PCT Pub. No.: WO2012/043576
PCT Pub. Date: Apr. 5, 2012

(65) Prior Publication Data
US 2013/0141826 A1    Jun. 6, 2013

(30) Foreign Application Priority Data

Sep. 30, 2010 (JP) ................................ 2010-221411

(51) Int. Cl.
| | |
|---|---|
| *H02H 9/00* | (2006.01) |
| *H02H 9/04* | (2006.01) |
| *H01C 7/12* | (2006.01) |
| *H01T 1/20* | (2006.01) |
| *H01T 4/12* | (2006.01) |

(52) U.S. Cl.
CPC ............. *H02H 9/041* (2013.01); *H01C 7/12* (2013.01); *H01T 1/20* (2013.01); *H01T 4/12* (2013.01)
USPC ........................................................... 361/56

(58) Field of Classification Search
USPC ............................................................ 361/56
See application file for complete search history.

(56) References Cited

U.S. PATENT DOCUMENTS

| | | | |
|---|---|---|---|
| 7,633,735 B2 * | 12/2009 | Urakawa | ..................... 361/112 |
| 2008/0079533 A1 | 4/2008 | Liu et al. | |
| 2011/0222203 A1 | 9/2011 | Adachi et al. | |

FOREIGN PATENT DOCUMENTS

| | | |
|---|---|---|
| JP | A-53-122744 | 10/1978 |
| JP | A-11-21182 | 1/1999 |
| JP | A-2008-85284 | 4/2008 |
| JP | A-2008-244348 | 10/2008 |
| JP | B2-4247581 | 4/2009 |
| WO | WO 2010/061519 A1 | 6/2010 |

OTHER PUBLICATIONS

Dec. 13, 2011 International Search Report issued in International Application No. PCT/JP2011/072104.

* cited by examiner

*Primary Examiner* — Scott Bauer
(74) *Attorney, Agent, or Firm* — Oliff PLC

(57) ABSTRACT

The present invention provides an ESD protection device that not only has small electrostatic capacitance and an excellent discharge property but also has high durability against repeated use with the occurrence of short-circuiting between electrodes after discharge inhibited. An ESD protection device including an insulating substrate, electrodes arranged on this insulating substrate away from and opposite each other, and a discharge induction section located between these electrodes, wherein the discharge induction section is composed of a porous body, in which micropores are discontinuously scattered, and has a hollow structure having at least one or more hollow sections.

12 Claims, 12 Drawing Sheets

ESD PROTECTION DEVICE

CROSS-REFERENCES TO RELATED APPLICATIONS

This application relates to and claims priority from Japanese Patent Application No. 2010-221411, filed on Sep. 30, 2010, the entire disclosure of which is incorporated herein by reference.

TECHNICAL FIELD

The present invention relates to an ESD protection device and particularly to an ESD protection device that is useful for use in a high-speed transmission system and combination with a common mode filter.

BACKGROUND ART

In recent years, the size reduction and performance enhancement of electronic apparatuses have been rapidly in progress. In addition, there has been significant progress in increasing transmission speed (an increased frequency exceeding 1 GHz) and reducing driving voltage, as typically seen in high-speed transmission systems, such as USB2.0, S-ATA2, and HDMI. On the other hand, the withstand voltage of electronic components used in electronic apparatuses decreases with the size reduction of electronic apparatuses and reduced driving voltage therefor. Therefore, the protection of electronic components from overvoltage typified by electrostatic pulses generated when a human body comes into contact with a terminal of an electronic apparatus has become an important technical problem.

Conventionally, in order to protect electronic components from such electrostatic pulses, a method of providing a stacked varistor between the ground and a line to be subjected to static electricity has generally been used. However, the varistor generally has large electrostatic capacitance, and therefore, when it is used in a high-speed transmission system, it becomes a factor in degrading signal quality. Therefore, the development of an ESD protection device having small electrostatic capacitance, that is applicable to high-speed transmission systems, has been required.

As an ESD protection device having low electrostatic capacitance, one in which an electrostatic protection material is filled between electrodes arranged away from and opposite each other has been proposed. An ESD protection device of this type in which what is called gap type electrodes are mounted has the advantages of large insulation resistance, small electrostatic capacitance, and good responsivity. On the other hand, a problem of the ESD protection device is that breakage (melting, deformation, and the like) occurs easily in the electrodes and their periphery (hereinafter simply referred to as the "electrode periphery") due to heat and stress generated by discharge.

As a technique for inhibiting the breakage of the electrode periphery, for example, Patent Document 1 describes a multilayer chip varistor in which a ceramic body (electrostatic protection material) made of a protection material and having small holes, for inhibiting transient surge voltage and electrostatic shock, is located between opposite electrodes. In this technique, as the protection material, composite particles in which surfaces of semi-conductive particles or conductive particles having a particle size larger than 0.1 microns are coated with a layer of inorganic glass are used, and the above-described small holes are formed between these composite particles (see FIG. 2 in Patent Document 1).

In addition, Patent Document 2 describes an ESD protection device including discharge electrodes arranged away from and opposite each other, a cavity section provided above the discharge electrodes, and a mixing section (electrostatic protection material) located below and adjacent to the discharge electrodes.

CITATION LIST

Patent Documents

Patent Document 1: Japanese Patent Laid-Open No. 2008-244348
Patent Document 2: Japanese Patent No. 4247581

SUMMARY OF INVENTION

Problem to be Solved by Invention

However, in the technique described in Patent Document 1, the composite particles in which the surfaces of (semi-)conductive particles are coated with inorganic glass are filled between the opposite electrodes to form the electrostatic protection material, and therefore, a high-performance ESD protection device applicable to high-speed transmission systems is not obtained. In addition, another problem is that it is difficult to completely absorb heat and stress, generated by discharge, by the small holes formed between the composite particles, and therefore, fused materials are produced between the electrodes due to the breakage of the electrode periphery, and short-circuiting occurs between the electrodes due to the aggregation of these fused materials.

On the other hand, in the technique described in Patent Document 2, it is possible to absorb heat and stress, generated by discharge, by the cavity section formed above the opposite electrodes, but a discharge induction section (electrostatic protection material) is formed on lower surfaces of the opposite electrodes, and the discharge induction section is not formed between the opposite electrodes. Therefore, discharge may not occur stably.

The present invention has been made in view of such circumstances. It is an object of the present invention to provide an ESD protection device that not only has small electrostatic capacitance and an excellent discharge property but also has high durability against repeated use, in which the occurrence of short-circuiting between electrodes after discharge is inhibited.

Means for Solving the Problem

In order to solve the above problems, the present inventors have diligently studied over and over, and, as a result, have thus found that the above problems can be solved by disposing a discharge induction section that is composed of a porous body, in which micropores are discontinuously scattered, and has a hollow structure having at least one or more hollow sections, as a discharge induction section disposed between paired electrodes, leading to the completion of the present invention.

Specifically, an ESD protection device according to the present invention includes an insulating substrate, electrodes arranged on the insulating substrate away from and opposite each other, and a discharge induction section located between the electrodes, wherein the discharge induction section is composed of a porous body in which micropores are discontinuously scattered, and has a hollow structure having at least one or more hollow sections.

As a result of measurement of the characteristics of the ESD protection devices configured as described above, the present inventors have found that the ESD protection device has small electrostatic capacitance and low discharge start voltage, and further that the occurrence of short-circuiting between the electrodes is inhibited in the ESD protection device. The details of the mechanism of such effects have not been clarified yet, but are estimated to be, for example, as follows.

In the ESD protection device having the above configuration, the discharge induction section is disposed between the electrodes, and therefore, the advantages of the ESD protection device is that it has larger insulation resistance, smaller electrostatic capacitance, better responsivity, and a better discharge property, compared to those in conventional modes not having such a discharge induction section between electrodes. Moreover, the discharge induction section composed of the above-described structure can sufficiently absorb heat and stress, generated by discharge, by its micropores and hollow structure, and thus, the breakage (melting, deformation, and the like) of the electrodes and their periphery (hereinafter simply referred to as the "electrode periphery") accompanying discharge is reduced. Furthermore, in the discharge induction section having the above-described hollow structure, discharge occurring between the electrodes is easily generated mainly on a surface of the hollow section of the discharge induction section (an interface between the porous body and the hollow section), and therefore, the physical breakage (melting, deformation, and the like) of the discharge induction section accompanying discharge is also reduced. Therefore, the ESD protection device having the above configuration has significantly enhanced durability against repeated use compared with those in conventional modes. Even if fused materials are produced between the electrodes due to the breakage of the electrode periphery accompanying discharge, short-circuiting between the electrodes is inhibited in the ESD protection device having the above configuration because it has a configuration in which the aggregation of a fused material (particularly, a conductive fused material) is not easily concentrated at one place, due to the presence of the discontinuously scattered micropores and the hollow section. It is surmised that as a result of these effects being combined, the ESD protection device having the above configuration not only has small electrostatic capacitance and an excellent discharge property but also has high durability against repeated use, and further the occurrence of short-circuiting between the electrodes after discharge is inhibited. However, the effects of the present invention are not limited to those described above.

Here, it is preferred that the above hollow section is formed so as to extend along a direction of connecting the electrodes. When the hollow section is formed in this manner, discharge occurring between the electrodes is easily generated in the extending direction of the hollow section. Therefore, the durability is improved, and variations in peak voltage and discharge start voltage are inhibited.

In addition, it is preferred that in the above discharge induction section, a length of the hollow section in the direction of connecting the electrodes is 0.5 times a gap distance ΔG between the electrodes to less than discharge induction section length. When the discharge induction section is configured in this manner, the breakage of the discharge induction section due to discharge is effectively inhibited, and the durability against repeated use is further enhanced.

Further, it is preferred that the above electrodes are exposed in the hollow section. When the electrodes are exposed in the hollow section in this manner, more preferably, when at least part of the tip portions of the electrodes are exposed in the hollow section, discharge occurring between the electrodes is easily generated on the surface of the hollow section of the discharge induction section (the interface between the porous body and the hollow section). Therefore, the effect of improving the discharge property and the effect of improving the durability against repeated use described above are especially enhanced.

The above discharge induction section may have a plurality of hollow sections. By adopting a discharge induction section having a plurality of hollow sections, the frequency (number of times) of discharge occurrence for one hollow section can be reduced during use, and therefore, the durability against repeated use in the ESD protection device is further enhanced, and variations in peak voltage and discharge start voltage are inhibited.

Here, it is especially preferred that in the above ESD protection device, the porous body forming the discharge induction section is a composite in which at least one type of conductive inorganic material is discontinuously dispersed in a matrix of at least one type of insulating inorganic material. A composite of this type functions as a low-voltage discharge type electrostatic protection material that has small electrostatic capacitance and low discharge start voltage, and therefore, a high-performance ESD protection device that is excellent in a discharge property is provided. Moreover, the composite of inorganic materials is adopted as the electrostatic protection material, and therefore, the heat resistance is significantly enhanced, and the weatherability against an external environment, such as temperature and humidity, is significantly enhanced.

In the specification, a "composite" means a state in which a conductive inorganic material is dispersed in a matrix of an insulating inorganic material. The composite is a concept including not only a state in which a conductive inorganic material is uniformly or randomly dispersed in a matrix of an insulating inorganic material, but also a state in which aggregates of a conductive inorganic material are dispersed in a matrix of an insulating inorganic material, that is, a state generally called a sea-island structure. In addition, in the specification, an "insulating property" means 0.1 Ωcm or more, and "conductivity" means less than 0.1 Ωcm. What is called "semi-conductivity" is included in the former insulating property as long as specific resistance is 0.1 Ωcm or more.

Here, the above insulating inorganic material is preferably at least one type selected from the group consisting of $Al_2O_3$, SrO, CaO, BaO, $TiO_2$, $SiO_2$, ZnO, $In_2O_3$, NiO, COO, $SnO_2$, $V_2O_5$, CuO, MgO, $ZrO_2$, MN, BN, and SiC. These metal compounds are excellent in an insulating property, heat resistance, and weatherability, and therefore function effectively as a material forming the insulating matrix of the composite. As a result, it is possible to provide a high-performance ESD protection device that is excellent in a discharge property, heat resistance, and weatherability.

In addition, it is preferred that the above conductive inorganic material is at least one type of metal selected from the group consisting of C, Ni, Al, Fe, Cu, Ti, Cr, Au, Ag, Pd, and Pt, or a metal compound thereof. By blending these metals or metal compounds in the matrix of the insulating inorganic material in the state of being discontinuously dispersed, it is possible to provide a high-performance ESD protection device that is excellent in a discharge property, heat resistance, and weatherability.

Further, the above discharge induction section preferably has a thickness of 10 nm or more and less than device thickness, more preferably 10 nm or more and half of the device thickness or less. By forming a composite having a thickness of 10 nm or more and less than device thickness in this manner, further size reduction and performance enhancement of electronic apparatuses using this ESD protection device are provided. It is assumed that this ESD protection device is used in a mode in which the discharge induction section is coated with an insulating material in order to protect the discharge induction section. Therefore, when the ESD protection device is used in such a mode, the upper limit of the thickness of the discharge induction section is limited by the thickness of the device.

In addition, it is preferred that the above discharge induction section is a fired body obtained by firing a mixture at least comprising at least one type of insulating inorganic material, at least one type of conductive inorganic material, and at least one type of resin particles, and removing the resin particles. By doing so, it is possible to obtain one that is a composite in which a conductive inorganic material is discontinuously dispersed in a matrix of an insulating inorganic material, that is a porous body in which micropores are discontinuously scattered, and that has a hollow structure having at least one or more hollow sections, in a simple and convenient manner with good reproducibility, and the productivity and the economy are enhanced.

In addition, another aspect of the present invention provides a discharge induction section for an ESD protection, which is composed of a porous body in which micropores are discontinuously scattered, and has a hollow structure having at least one or more hollow sections.

Advantageous Effects of Invention

According to the present invention, it is possible to provide an ESD protection device that not only has small electrostatic capacitance and an excellent discharge property but also has high durability against repeated use with the occurrence of short-circuiting between electrodes after discharge inhibited. In addition, according to the present invention, the heat resistance and the weatherability can also be enhanced, and furthermore, a thinner devise can be achieved compared with conventional ones, and the productivity and the economy can also be enhanced.

DESCRIPTION OF EMBODIMENTS

Figure 1:
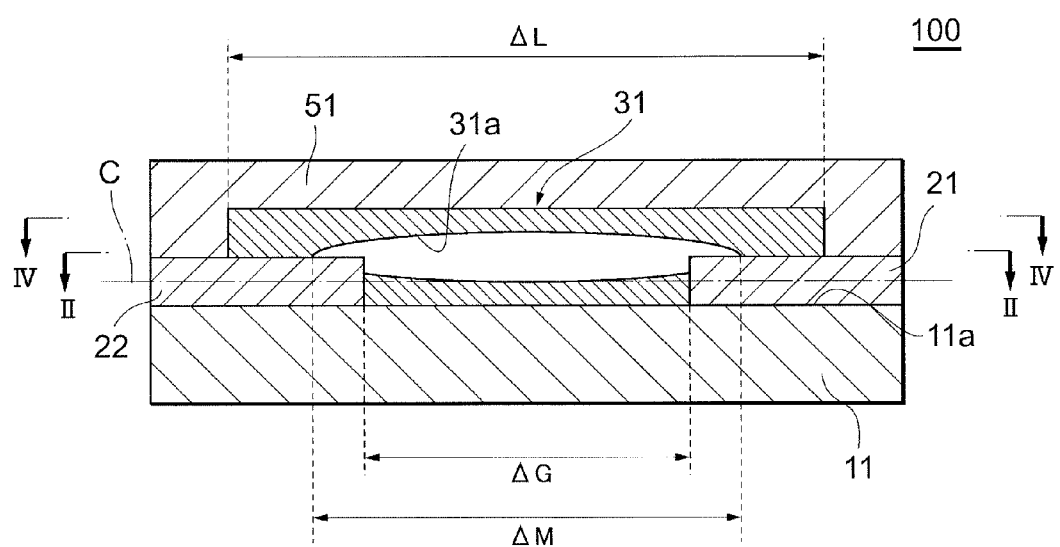
FIG. 1 is a schematic sectional view schematically showing an ESD protection device 100.

Embodiments of the present invention will be described below. Like numerals refer to like elements, and duplicate description is omitted. In addition, positional relationships such as vertical and lateral positions are based on those shown in the drawings unless otherwise specified. Moreover, dimensional scales for the drawings are not limited to those shown in the drawings. Furthermore, the embodiments described below are examples based on which the present invention will be described. The present invention is not limited to the embodiments.

First Embodiment

Figure 2:
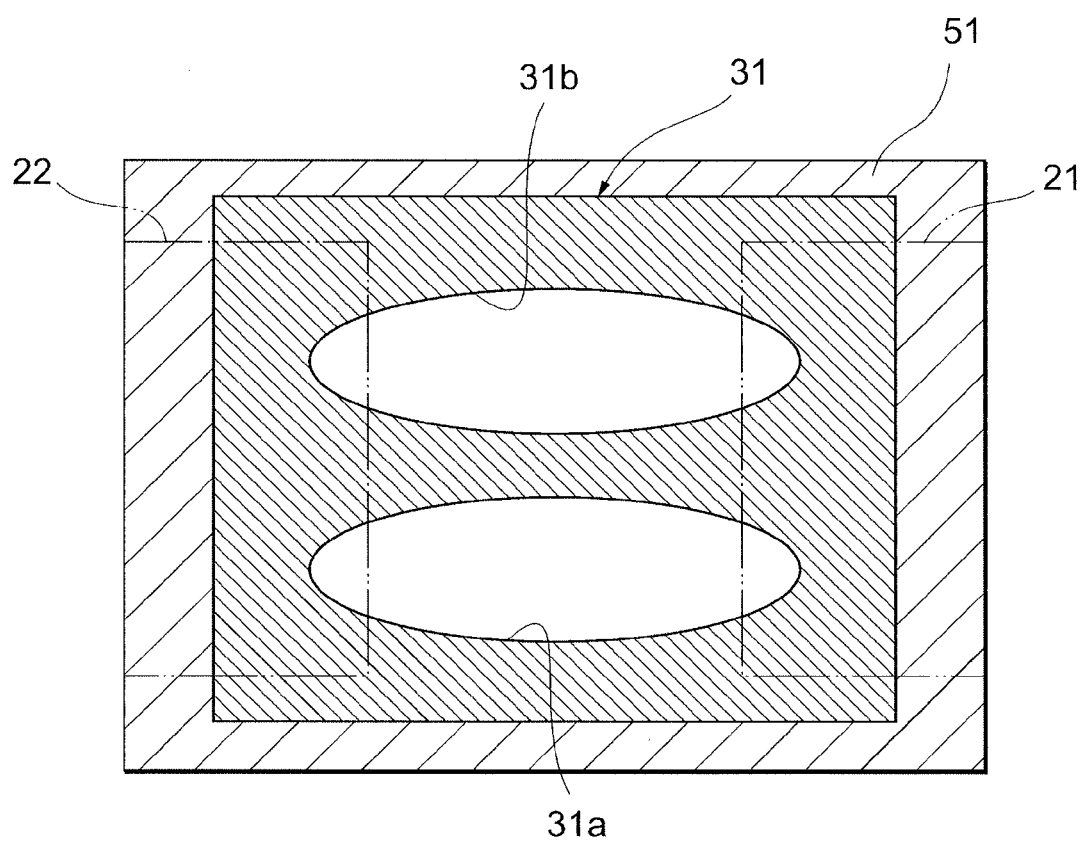
FIG. 2 is a sectional view taken along the line II-II in FIG. 1.

FIG. 1 is a schematic sectional view schematically showing an ESD protection device in the present embodiment, and FIG. 2 is a sectional view taken along the line II-II in FIG. 1.

An ESD protection device 100 includes an insulating substrate 11, paired electrodes 21 and 22 disposed on this insulating substrate 11, a discharge induction section 31 disposed between these electrodes 21 and 22, terminal electrodes 41 (see FIG. 7) electrically connected to the electrodes 21 and 22, and an insulating protection layer 51 formed so as to cover the discharge induction section 31. The discharge induction section 31 is composed of a porous body, in which micropores are discontinuously scattered, and has a hollow structure having at least one or more hollow sections 31a and 31b. Here, the paired electrodes 21 and 22 are located so that their tip portions are exposed in these hollow sections 31a and 31b. In this ESD protection device 100, the discharge induction section 31 functions as a low-voltage discharge type electrostatic protection material and is designed so that when overvoltage, such as static electricity, is applied, initial discharge occurs between the electrodes 21 and 22 via this discharge induction section 31 (the hollow sections 31a and 31b). Each component will be described in detail below.

The insulating substrate 11 has an insulating surface 11a. The dimensions and shape of the insulating substrate 11 are not particularly limited as long as the insulating substrate 11 can support at least the electrodes 21 and 22 and the discharge induction section 31. Here, the insulating substrate 11 having the insulating surface 11a is a concept including, in addition to a substrate composed of an insulating material, a substrate with an insulating film produced on a part or the entire surface of the substrate.

Specific examples of the insulating substrate 11 include a ceramic substrate and a single-crystal substrate using a low-dielectric-constant material having a dielectric constant of 50 or less, preferably 20 or less, such as alumina, silica, magnesia, aluminum nitride, or forsterite. In addition, it is possible to suitably use a ceramic substrate, a single-crystal substrate, or the like on the surface of which an insulating film composed of a low-dielectric-constant material having a dielectric constant of 50 or less, preferably 20 or less, such as alumina, silica, magnesia, aluminum nitride, or forsterite is formed. For the insulating protection layer 51, one similar to this insulating substrate 11 can be used, and hereinafter duplicate description is omitted.

The paired electrodes 21 and 22 are disposed on the insulating surface 11a of the insulating substrate 11 away from each other. In the present embodiment, the paired electrodes 21 and 22 are oppositely arranged at a substantially central position of the insulating substrate 11 as seen in a plan view, with a gap distance ΔG. Here, the gap distance ΔG means the shortest distance between the paired electrodes 21 and 22.

Examples of the material forming the electrodes 21 and 22 include, but are not particularly limited to, at least one type of metal selected from C, Ni, Al, Fe, Cu, Ti, Cr, Au, Ag, Pd, and Pt, or an alloy thereof. In the present embodiment, the electrodes 21 and 22 are formed in a rectangular shape as seen in a plan view. But, their shape is not particularly limited, and the electrodes 21 and 22 may be formed, for example, in a comb teeth shape or in a saw shape.

The gap distance ΔG between the electrodes 21 and 22 should be appropriately set in view of the desired discharge property and is not particularly limited. The gap distance ΔG is generally about 1 to 50 μm, and is more preferably about 3 to 40 μm, further preferably about 7 to 30 μm, in terms of ensuring low-voltage initial discharge. The thickness of the electrodes 21 and 22 can be appropriately set and is not particularly limited. The thickness of the electrodes 21 and 22 is generally about 1 to 20 μm.

The method for forming the electrodes 21 and 22 is not particularly limited, and a well-known technique can be appropriately selected. Specific examples of the method include a method of pattern-forming an electrode layer having the desired thickness on the insulating substrate 11 by coating, transfer, electrolytic plating, nonelectrolytic plating, deposition, sputtering, or the like. In addition, the size of the electrodes 21 and 22 and the gap distance ΔG can be processed using a well-known technique, for example, ion milling or etching. In addition, the electrodes 21 and 22 may be formed by performing screen printing using plate, on which the gap section between the electrodes 21 and 22 is pattern-formed, to pattern-print a precursor of a metal or an alloy on a substrate, and then performing firing. Alternatively, a green sheet composed of an insulator, on which the electrodes 21 and 22 are formed by screen printing, may be formed into an element by a stacking method. In addition, the gap section between the electrodes 21 and 22 may be formed by laser processing or the like after the coating of a precursor of a metal or an alloy, for example, an electrode paste.

The discharge induction section 31 is disposed between the above electrodes 21 and 22. In the present embodiment, the discharge induction section 31 is stacked on the insulating surface 11a of the insulating substrate 11 described above and on the electrodes 21 and 22. The dimensions and shape and disposition position of this discharge induction section 31 is not particularly limited as long as the discharge induction section 31 is designed so that initial discharge occurs between the electrodes 21 and 22 via the discharge induction section 31 itself when overvoltage is applied.

Figure 3:
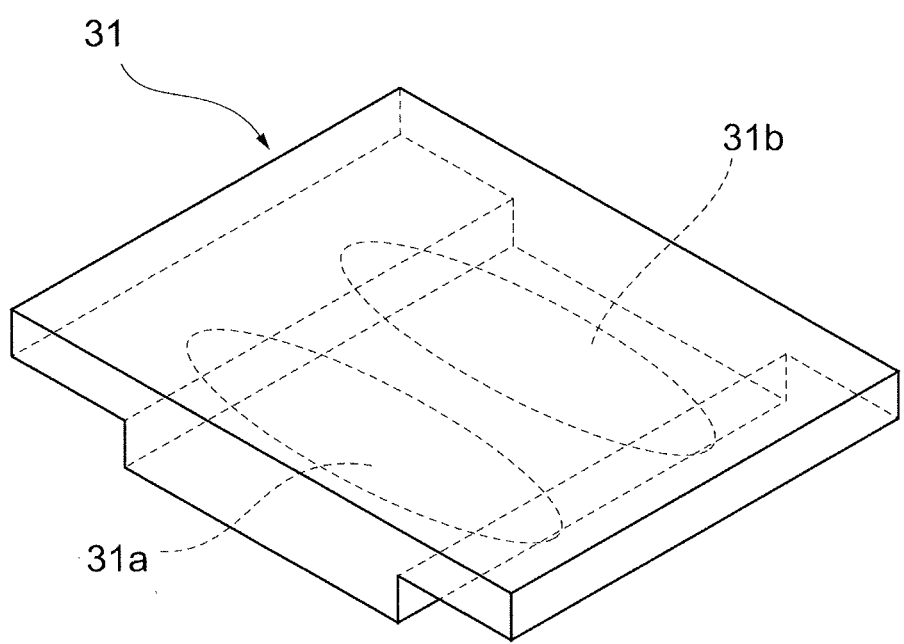
FIG. 3 is a schematic perspective view schematically showing a discharge induction section 31.
Figure 4:
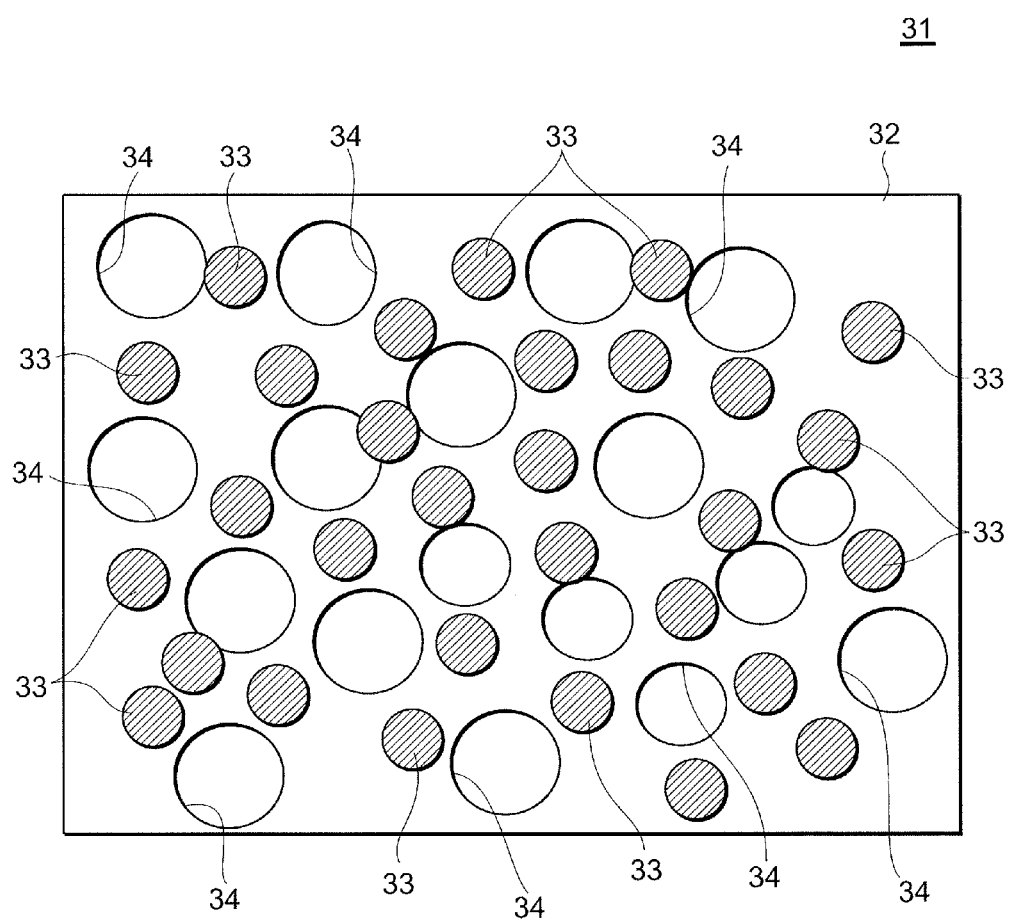
FIG. 4 is a sectional conceptual view taken along the line IV-IV in FIG. 1.

FIG. 3 is a schematic plan view schematically showing the discharge induction section 31 in the present embodiment, and FIG. 4 is a conceptual view of section IV-IV in FIG. 1.

The discharge induction section 31 is composed of a porous body having a hollow structure having the hollow sections 31a and 31b. In the present embodiment, a composite in which a conductive inorganic material 33 is discontinuously (uniformly or randomly) dispersed in a matrix of an insulating inorganic material 32 is used as the discharge induction section 31. This discharge induction section 31 is composed of a porous body (porous composite) in which micropores 34 are discontinuously scattered, as shown in FIG. 4. In other words, the discharge induction section 31 in the present embodiment has a hollow structure by the formation of the hollow sections 31a and 31b and on the other hand has a porous structure in which the micropores 34 are discontinuously scattered in the composite. In other words, in the discharge induction section 31, the hollow sections 31a and 31b are partitioned by a porous body in which the conductive inorganic material 33 and the micropores 34 are contained in the matrix of the insulating inorganic material 32 in the state of being discontinuously scattered.

Specific examples of the insulating inorganic material 32 forming the matrix include, but are not particularly limited to, metal oxides and metal nitrides, such as forsterite. In view of an insulating property and cost, the metal oxides are preferably $Al_2O_3$, SrO, CaO, BaO, $TiO_2$, $SiO_2$, ZnO, $In_2O_3$, NiO, CoO, $SnO_2$, $V_2O_5$, CuO, MgO, $ZrO_2$, MN, BN, and SiC. One of these may be used alone, or two or more of these may be used together. The matrix of the insulating inorganic material 32 may be formed as a uniform film of the insulating inorganic material 32 or as an aggregate of particles of the insulating inorganic material 32, and its properties are not particularly limited. Among these, $Al_2O_3$, $SiO_2$, forsterite, and the like are more preferably used in terms of providing a high insulating property to the insulating matrix. On the other hand, $TiO_2$ and ZnO are more preferably used in terms of providing semi-conductivity to the insulating matrix. By providing semi-conductivity to the insulating matrix, an ESD protection device having lower discharge start voltage can be obtained.

Specific examples of the conductive inorganic material 33 include, but are not particularly limited to, metals, alloys, metal oxides, metal nitrides, metal carbides, and metal borides. In view of conductivity, C, Ni, Al, Fe, Cu, Ti, Cr, Au, Ag, Pd, and Pt or alloys thereof are preferred.

Specific examples of the conductive inorganic material 33 include, but are not particularly limited to, metals, alloys, metal oxides, metal nitrides, metal carbides, and metal borides. In view of conductivity, C, Ni, Al, Fe, Cu, Ti, Cr, Au, Ag, Pd, and Pt or alloys thereof are preferred.

The micropores 34 provide porosity to the discharge induction section 31 (composite), and thus absorb heat and stress generated by discharge, and reduce the breakage (melting, deformation, and the like) of the electrodes 21 and 22 and their periphery. Here, in the specification, the micropores 34 mean those having a size of 0.1 to 5 μm. In addition, in the specification, the size of the micropores 34 having a spherical shape having an aspect ratio of 1 to 5 means median diameter (D50), and the size of the micropores 34 having other shapes means the arithmetic mean values of the major axis and the minor axis, which are the mean values of 50 micropores 34 selected at random. The size of the micropores 34 and the content ratio of the micropores 34 (the volume proportion (vol %) of the micropores 34 to the discharge induction section 31) can be appropriately set according to the desired discharge property, and durability against repeated use, and the property of preventing short-circuiting between the electrodes 21 and 22, and are not particularly limited. But, the size of the micropores 34 is preferably 0.1 to 2 μm, and the content ratio of the micropores 34 is preferably 1 to 40 vol %, more preferably 2 to 30 vol %, and further preferably 5 to 20 vol %.

The hollow structure of the discharge induction section 31 is not particularly limited. In the present embodiment, the hollow structure having two hollow sections 31a and 31b is adopted, but the number of hollow sections is not limited and may be only one or plural (for example, 3 to 5). As the number of hollow sections increases, the frequency (number of times) of discharge occurrence for one hollow section is reduced, and therefore, there is a tendency that the durability against repeated use is further enhanced, and variations in peak voltage and discharge start voltage are inhibited. When a plurality of hollow sections are provided, the shapes and sizes of the respective hollow sections may be the same or different.

In addition, the shape of the hollow sections 31a and 31b is also not particularly limited. Any shape, for example, a spherical shape, an oval spherical shape, a cubic shape, a rectangular parallelepiped shape, a cylindrical column shape, a triangular column shape, a rectangular column shape, a polygonal column shape, and an irregular shape in which these are connected, can be adopted. Particularly, the hollow sections 31a and 31b preferably has the shape of extending along the direction of connecting the electrodes 21 and 22. By forming the hollow sections 31a and 31b in this manner, discharge occurring between the electrodes 21 and 22 occurs easily in the extending direction of the hollow sections 31a and 31b. Therefore, the durability is improved, and variations in peak voltage and discharge start voltage are inhibited.

On the other hand, the size of the hollow sections 31a and 31b is also not particularly limited. But, in terms of inhibiting breakage due to discharge to enhance durability against repeated use, the length of the hollow sections 31a and 31b in the direction of connecting the electrodes 21 and 22 (shown as ΔM) is preferably at least 0.5 times the gap distance ΔG between the electrodes 21 and 22 to less than the length of the discharge induction section 31 (shown as ΔL). The length of the hollow sections 31a and 31b in the direction of connecting the electrodes 21 and 22 means the maximum length of the hollow sections 31a and 31b in the direction of connecting the electrodes 21 and 22. The length of the discharge induction section 31 means the maximum length of the discharge induction section 31 in the direction of connecting the electrodes 21 and 22. For example, when the ESD protection device 100 having a gap distance ΔG of about 10 to 20 μm is fabricated, the length of the hollow sections 31a and 31b in the direction of connecting the electrodes 21 and 22 is 5 to 10 μM or more and less than the length of the discharge induction section 31. Particularly, by setting the length of the hollow sections 31a and 31b in the direction of connecting the electrodes 21 and 22 (shown as ΔM) to 1.0 time or more the gap distance ΔG between the electrodes 21 and 22 and providing an arrangement in which the tip portions of the electrodes 21 and 22 are exposed in the hollow sections 31a and 31b, as shown in FIGS. 1 and 2, the effect of improving the discharge property and the effect of improving the durability against repeated use described above are especially enhanced.

On the other hand, it is preferred that the placement position of the hollow sections 31a and 31b is above the electrodes 21 and 22 in the upper and lower directions in the plane of the paper in FIG. 1, more specifically, a position that is offset upward from the center line C of the electrodes 21 and 22, in terms of enhancing the discharge property and the durability against repeated use as well as promoting simple and convenient manufacturing and facilitating inexpensiveness.

The thickness (total thickness) of the discharge induction section 31 is not particularly limited and can be appropriately set. But, in terms of enhancing durability against repeated use, the thickness is preferably 10 nm or more and the device thickness or less, more preferably 1 μm to half of the device thickness or less.

The method for forming the discharge induction section 31 is not particularly limited, and, for example, well-known thin-film formation methods and stacking methods can be applied. In terms of obtaining the discharge induction section 31 that is composed of a porous body containing the micropores 34 having the desired size in a matrix at a predetermined content ratio and has the above structure, in a simple and convenient manner with good reproducibility, a method of forming the above porous body having the micropores 34 and partition-forming the above hollow structure by coating a mixture containing at least an insulating inorganic material, a conductive inorganic material, and a resin material that vanishes by firing (vanishing material), for fabricating the micropores 34, further coating a vanishing material for fabricating the hollow sections 31a and 31b, in the desired shape at the desired positions on the mixture, and then firing them to vanish the vanishing materials is suitable. A preferred method for forming the discharge induction section 31 will be described below.

In this method, first, a mixture containing an insulating inorganic material, a conductive inorganic material, and a vanishing material for fabricating the micropores 34 is prepared, and this mixture is coated, printed, or the like in the gap between the electrodes 21 and 22. Then, a vanishing material for fabricating the hollow sections 31a and 31b is further coated, printed, or the like in the desired shape at predetermined positions on the mixture provided in the gap between the electrodes 21 and 22. Then, the above-described mixture may be further provided at a predetermined position on the mixture and/or on the resin paste by coating, printing, or the like, as required. Then, firing treatment is performed to vanish the vanishing materials by pyrolysis, volatilization, and the like. The vanishing materials are removed during firing in this manner, and thus, the discharge induction section 31 that is a porous body containing the micropores 34 having the desired size at a predetermined content ratio and has a hollow structure having the hollow sections 31a and 31b in the desired shape at the desired positions is obtained. Here, the treatment conditions during firing are not particularly limited, but in view of productivity and economy, about 10 minutes to 5 hours at 500 to 1200° C. under an air atmosphere is preferred.

The vanishing materials used in the above method are not particularly limited as long as they are pyrolyzed, volatilized, and the like to vanish during firing. Well-known ones can be appropriately selected and used. Specific examples of such vanishing materials include, but are not particularly limited to, resin particles and resin pastes. Examples of typical resin particles include those excellent in a pyrolysis property, such as acrylic resins. The shape of the resin particles is not particularly limited and may be any of, for example, a spindle shape, a column shape, a spherical shape having an aspect ratio of 1 to 5, an oval spherical shape having an aspect ratio exceeding 5, and an irregular shape. In addition, examples of typical resin pastes include a mixture in which a resin that is pyrolyzed, volatilized, and vanishes during firing, for example, an acrylic resin, ethyl cellulose, or polypropylene, is mixed with a well-known solvent. Here, when the micropores 34 are produced using resin particles, a particle diameter of the resin particles can be appropriately set so that the micropores 34 having the desired size are obtained. The particle diameter of the resin particles is not particularly limited, but is preferably about 0.1 to 4 μm. In the specification, the particle diameter of resin particles having a spherical shape means median diameter (D50), and the particle diameter of resin particles having other shapes means the arithmetic mean values of the major axis and the minor axis. In this case, the blending proportion of the resin particles can be appropriately set in view of the content ratio of the micropores 34 in the obtained discharge induction section 31 and is not particularly limited, but is preferably about 1 to 30 vol %. In the preparation of the mixture or in the coating or printing of the mixture, various additives, such as a solvent and a binder, may be blended. In addition, when the hollow sections 31a and 31b are produced using a resin paste, the solid concentration, viscosity, and the like of the resin paste can be appropriately adjusted so that the hollow sections 31a and 31b having the desired shape and size are obtained. In the preparation of the resin paste or in the coating or printing of the resin paste, various additives, such as a solvent, a surfactant, and a thickening agent, may be blended. In addition, even if a structure (molded body) that has a shape corresponding to the hollow sections 31a and 31b having the desired shape and size and is composed of a resin, fiber, or the like that is pyrolyzed, volatilized, and vanishes during firing, or the like is used instead of the vanishing material or together with the vanishing material, the hollow sections 31a and 31b can be fabricated.

In the ESD protection device 100 in the present embodiment, the discharge induction section 31, which is the composite in which the conductive inorganic material 33 is discontinuously dispersed in the matrix of the insulating inorganic material 32, functions effectively as a low-voltage discharge type electrostatic protection material that has large insulation resistance, small electrostatic capacitance, good responsivity, and an excellent discharge property. The discharge induction section 31 is composed of the porous body, in which the micropores 34 are discontinuously scattered, and has the hollow structure having the hollow sections 31a and 31b. Therefore, the breakage of the electrode periphery and the breakage of the discharge induction section are reduced, and therefore, the durability against repeated use is significantly enhanced. In addition, the discharge induction section 31 is composed of the composite composed of inorganic materials, and therefore, the heat resistance is enhanced, and the properties do not vary easily due to an external environment, such as temperature and humidity. As a result, the reliability is enhanced. Furthermore, the discharge induction section 31 has a configuration in which the aggregation of a fused material, which can be produced by discharge, is not easily concentrated at one place, and therefore, short-circuiting between the electrodes 21 and 22 is effectively inhibited. From the above, the high-performance ESD protection device 100 that not only has small electrostatic capacitance and an excellent discharge property but also has high durability against repeated use with the occurrence of short-circuiting between the electrodes after discharge inhibited is provided.

EXAMPLES

The present invention will be described below in detail with reference to Examples. However, the present invention is not limited to the Examples.

Example 1

Figure 5:
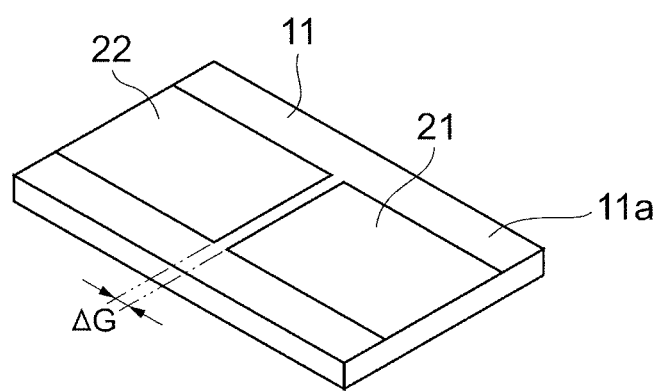
FIG. 5 is a schematic perspective view showing a process of manufacturing the ESD protection device 100.

First, as shown in FIG. 5, a green sheet (manufactured by TDK Corporation) obtained by sheeting a material composed mainly of $Al_2O_3$ and a glass component was prepared as an insulating substrate 11, and an Ag paste was printed with about a thickness of 20 μm on one insulating surface 11a of the insulating substrate 11 by screen printing to pattern-form paired band-like electrodes 21 and 22 arranged opposite each other. For the paired electrodes after the printing, the length and width of the electrodes 21 and 22 were 0.5 mm and 0.4 mm respectively, and the gap distance ΔG between the electrodes 21 and 22 was 30 μm.

Figure 6:
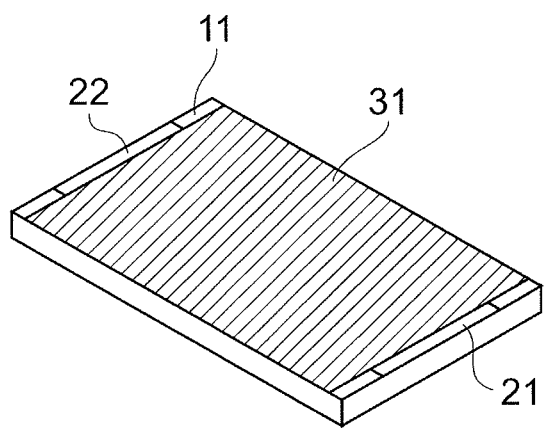
FIG. 6 is a schematic perspective view showing the process of manufacturing the ESD protection device 100.

Next, as shown in FIG. 6, a discharge induction section 31 was formed on the above insulating substrate 11 and on the above electrodes 21 and 22 by the following procedure.

First, 10 vol % of glass particles composed mainly of $SiO_2$ (manufactured by Nihon Yamamura Glass Co., Ltd., product number: ME13) as an insulating inorganic material 32, 30 vol % of $Al_2O_3$ having an average particle diameter of 1 μm (manufactured by Sumitomo Chemical Co., Ltd., product number: AM-27) as the insulating inorganic material 32, 30 vol % of Ag particles having an average particle diameter of 1 μm (manufactured by Mitsui Mining & Smelting Co., Ltd., product number: SPQ05S) as a conductive inorganic material 33, and 30 vol % of spherical acrylic resin particles having an average particle diameter of 1 μm (manufactured by Soken Chemical & Engineering Co., Ltd., product number: MX-150) for forming micropores 34 were weighed and mixed to obtain a mixture. Apart from this mixture, an ethyl cellulose-based resin as a binder, and terpineol as a solvent were kneaded to prepare a lacquer having a solid concentration of 8 wt %. Then, the lacquer was added to the mixture obtained as described above, and then, the mixture was kneaded to make a paste-like mixture.

Next, an acrylic resin was mixed with butyl carbitol as a solvent to make a resin paste (for producing hollow sections 31a and 31b) having a solid concentration of 40 wt %.

Then, a small amount of the obtained paste-like mixture was coated by screen printing so as to cover the insulating surface 11a of the insulating substrate 11 between the electrodes 21 and 22, and the above-described resin paste was screen-printed in an oval spherical shape at two places on this mixture after the coating and on the electrodes 21 and 22 in order to form the hollow sections 31a and 31b. Then, further, the above-described mixture was screen-printed so as to cover the oval spherical resin paste after the coating, to form the precursor of the discharge induction section 31 having substantially the same structure as that shown in FIG. 1 and FIG. 2. Then, the green sheet was stacked on the precursor of the discharge induction section 31, and then, they were further hot-pressed to fabricate a stack. Then, the obtained stack was cut to a predetermined size into individual pieces. Then, the stack formed into individual pieces was subjected to heat treatment (binder removal treatment) at 200° C. for 1 hour. Then, the temperature was increased by 10° C. per minute, and the stack was maintained in the air at 950° C. for 30 minutes. The acrylic resin particles, the ethyl cellulose-based resin, and the solvents were removed from the precursor of the discharge induction section 31 by this firing treatment to fabricate the discharge induction section 31 having substantially the same structure as that shown in FIGS. 1 to 3, which was composed of a porous body, in which the micropores 34 were discontinuously scattered, and had a hollow structure having the hollow sections 31a and 31. The gap distance ΔG between the paired electrodes 21 and 22 after the firing was 30 and the thickness was about 15 μm. In addition, the length of the hollow sections 31a and 31b in the direction of connecting the electrodes 21 and 22 (ΔM) was 40 μm.

Figure 7:
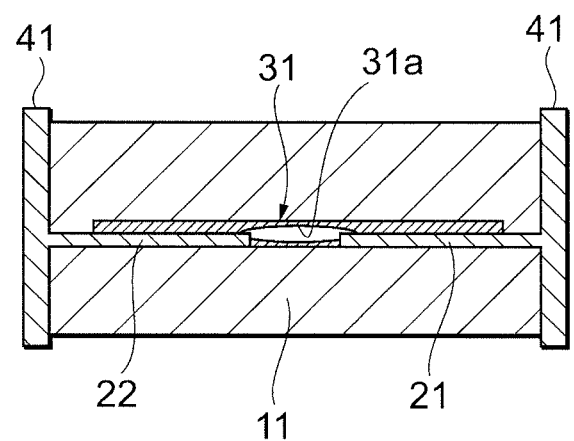
FIG. 7 is a schematic perspective view showing the process of manufacturing the ESD protection device 100.

Then, as shown in FIG. 7, terminal electrodes 41 composed mainly of Ag were formed so as to be connected to the outer peripheral ends of the electrodes 21 and 22, to obtain an ESD protection device 100 in Example 1.

Example 2

A discharge induction section 31 that was composed of a porous body, in which micropores 34 were discontinuously scattered, and had a hollow structure having one hollow section 31a was fabricated, and an ESD protection device 100 in Example 2 was obtained, by performing operations similar to those in Example 1 except that the resin paste was screen-printed in an oval spherical shape at only one place during the screen printing of the resin paste.

Comparative Example 1

A discharge induction section that was composed of a porous body, in which micropores 34 were discontinuously scattered, and had a non-hollow structure having no hollow section was fabricated, and an ESD protection device in Comparative Example 1 was obtained, by performing operations similar to those in Example 1 except that the mixture was used instead of the resin paste during the screen printing of the resin paste.

Comparative Example 2

A discharge induction section that was composed of a porous body, in which micropores 34 were discontinuously scattered, and had a non-hollow structure having no hollow section was fabricated, and an ESD protection device in Comparative Example 2 was obtained, by performing operations similar to those in Comparative Example 1 except that spherical acrylic resin particles having an average particle diameter of 3 μm (manufactured by Soken Chemical & Engineering Co., Ltd., product number: MX-300) was used as a vanishing material for forming the micropores 34, instead of spherical acrylic resin particles having an average particle diameter of 1 μm (manufactured by Soken Chemical & Engineering Co., Ltd., product number: MX-150).

Example 3

A discharge induction section 31 that was composed of a porous body, in which micropores 34 were discontinuously scattered, and had a hollow structure having one hollow section 31a was fabricated, and an ESD protection device 100 in Example 3 was obtained, by performing operations similar to those in Example 2 except that the amounts of the components blended were changed to 10 vol % of glass particles, 50 vol % of $Al_2O_3$, 30 vol % of Ag particles, and 10 vol % of acrylic resin particles.

Example 4

A discharge induction section 31 that was composed of a porous body, in which micropores 34 were discontinuously scattered, and had a hollow structure having one hollow section 31a was fabricated, and an ESD protection device 100 in Example 4 was obtained, by performing operations similar to those in Example 2 except that spherical acrylic resin particles having an average particle diameter of 3 μm (manufactured by Soken Chemical & Engineering Co., Ltd., product number: MX-300) was used as a vanishing material for forming the micropores 34, instead of spherical acrylic resin particles having an average particle diameter of 1 μm (manufactured by Soken Chemical & Engineering Co., Ltd., product number: MX-150), and the amounts of the components blended were changed to 10 vol % of glass particles, 50 vol % of $Al_2O_3$, 30 vol % of Ag particles, and 10 vol % of acrylic resin particles.

Example 5

A discharge induction section 31 that was composed of a porous body, in which micropores 34 were discontinuously scattered, and had a hollow structure having hollow sections 31a and 31b was fabricated, and an ESD protection device 100 in Example 5 was obtained, by performing operations similar to those in Example 1 except that the amounts of the components blended were changed to 10 vol % of glass particles, 50 vol % of $Al_2O_3$, 30 vol % of Ag particles, and 10 vol % of acrylic resin particles.

Comparative Example 3

A discharge induction section that had no micropores 34 and had a non-hollow structure having no hollow section was fabricated, and an ESD protection device 100 in Comparative Example 3 was obtained, by performing operations similar to those in Comparative Example 1 except that the blending of acrylic resin particles was omitted, and the amounts of the components blended were changed to 15 vol % of glass particles, 55 vol % of $Al_2O_3$, and 30 vol % of Ag particles.

<Structure Observation>

In the ESD protection devices 100 in Examples 1 to 5 obtained as described above, a section of the discharge induction section 31 was polished, and the section was observed using an SEM. It was verified that all were composed of a porous body, in which the micropores 34 were discontinuously scattered, and had a hollow structure having one or two hollow sections.

<Fine Structure Observation>

In the ESD protection devices 100 in Examples 1 to 5 obtained as described above, a section of the discharge induction section 31 (a section of the place where the hollow sections 31a and 31b were not formed) was polished, the section was observed using an SEM, and a photograph was taken. For the taken photograph, the micropores were subjected to image processing, and the sum of the areas of the micropores was calculated, and divided by the total area to calculate the ratio of the micropores.

<Electrostatic Discharge Test>

Figure 8:
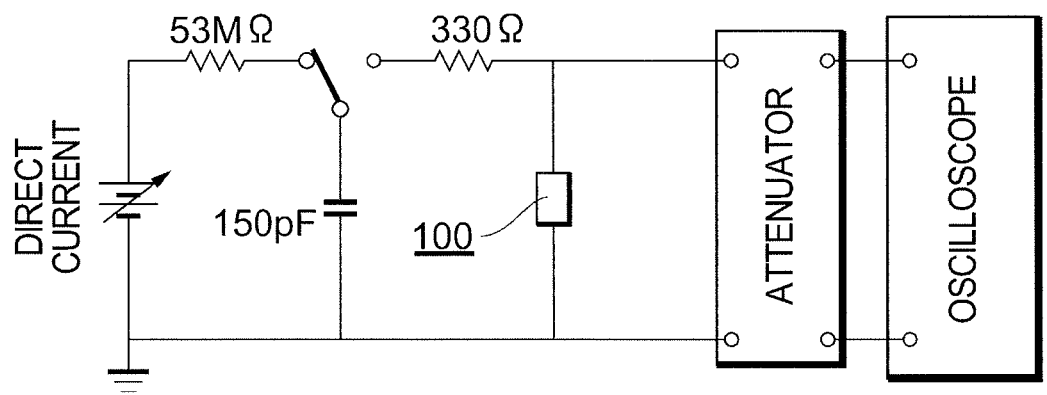
FIG. 8 is a circuit diagram in an electrostatic discharge test.

Next, for the ESD protection devices 100 in Examples 1 to 5 and the ESD protection devices in Comparative Examples 1 to 3 obtained as described above, an electrostatic discharge test was carried out using an electrostatic test circuit shown in FIG. 8. The test results are shown in Table 1 and Table 2.

This electrostatic discharge test was performed based on the electrostatic discharge immunity test and noise test of the international standard IEC 61000-4-2 in conformity with the human body model (discharge resistance: 330Ω, discharge capacity: 150 pF, applied voltage: 8.0 kV, contact discharge). Specifically, as shown in the electrostatic test circuit in FIG. 8, one terminal electrode of an ESD protection device to be evaluated was grounded, and an electrostatic pulse application section was connected to the other terminal electrode, and then, a discharge gun was brought into contact with the electrostatic pulse application section to apply electrostatic pulses. For the electrostatic pulses applied here, a voltage equal to or more than discharge start voltage was applied.

The discharge start voltage was a voltage at which an electrostatic absorption effect appeared in an electrostatic absorption waveform observed when the static electricity test was performed while the voltage was increased from 0.4 kV in increments of 0.2 kV. In addition, the electrostatic capacitance was electrostatic capacitance (pF) at 1 MHz. Further, for the short rate, 100 samples for each were prepared, and the number of occurrences of short-circuiting between the electrodes when the electrostatic discharge test was repeated 100 times at 8.0 kV for each was counted. The short rate was expressed by the proportion (%) of the number. In addition, for durability, 100 samples for each were prepared, the electrostatic discharge test was repeated 1000 times at 8.0 kV for each, and then, the number of samples having a peak voltage of 500 V or less for the 1001st discharge was counted. The durability was expressed by the proportion (%) of the number.

TABLE 1

|  |  | Comparative Example 1 | Comparative Example 2 | Example 1 | Example 2 |
|---|---|---|---|---|---|
| Ratio of insulating inorganic material | [vol %] | 40 | 40 | 40 | 40 |
| Ratio of conductive inorganic material | [vol %] | 30 | 30 | 30 | 30 |
| Average diameter of micropores | [μm] | 1 | 3 | 1 | 1 |
| Content ratio of micropores | [vol %] | 30 | 30 | 30 | 30 |
| Presence or absence of hollow sections |  | — | — | Two places | One place |
| Discharge start voltage | [kV] | 2.6 | 3.4 | 3.0 | 2.6 |
| Electrostatic capacitance | (pF) | 0.17 | 0.15 | 0.12 | 0.13 |
| Short rate | (%) | 5 | 3 | 0 | 0 |
| Durability | (%) | 60 | 60 | 95 | 85 |

TABLE 2

|  |  | Example 3 | Example 4 | Example 5 | Comparative Example 3 |
|---|---|---|---|---|---|
| Ratio of insulating inorganic material | [vol %] | 60 | 60 | 60 | 70 |
| Ratio of conductive inorganic material | [vol %] | 30 | 30 | 30 | 30 |
| Average diameter of micropores | [μm] | 1 | 3 | 1 | — |
| Content ratio of micropores | [vol %] | 10 | 10 | 10 | — |
| Presence or absence of hollow sections |  | One place | One place | Two places | — |
| Discharge start voltage | [kV] | 2.0 | 2.6 | 2.2 | 1.6 |
| Electrostatic capacitance | (pF) | 0.13 | 0.12 | 0.11 | 0.20 |
| Short rate | (%) | 0 | 0 | 0 | 90 |
| Durability | (%) | 85 | 85 | 90 | 30 |

From the results shown in Table 1 and Table 2, it was verified that the ESD protection devices in Examples 1 to 5 had small discharge start voltage, about 2 to 3 kV, and small electrostatic capacitance, less than 0.2 pF, and were high-performance ones applicable to high-speed transmission systems. Furthermore, it was verified that in the ESD protection devices in Examples 1 to 5, the occurrence of short-circuiting between the electrodes was especially inhibited, the durability against repeated use was enhanced, and the reliability was excellent.

Figure 9:
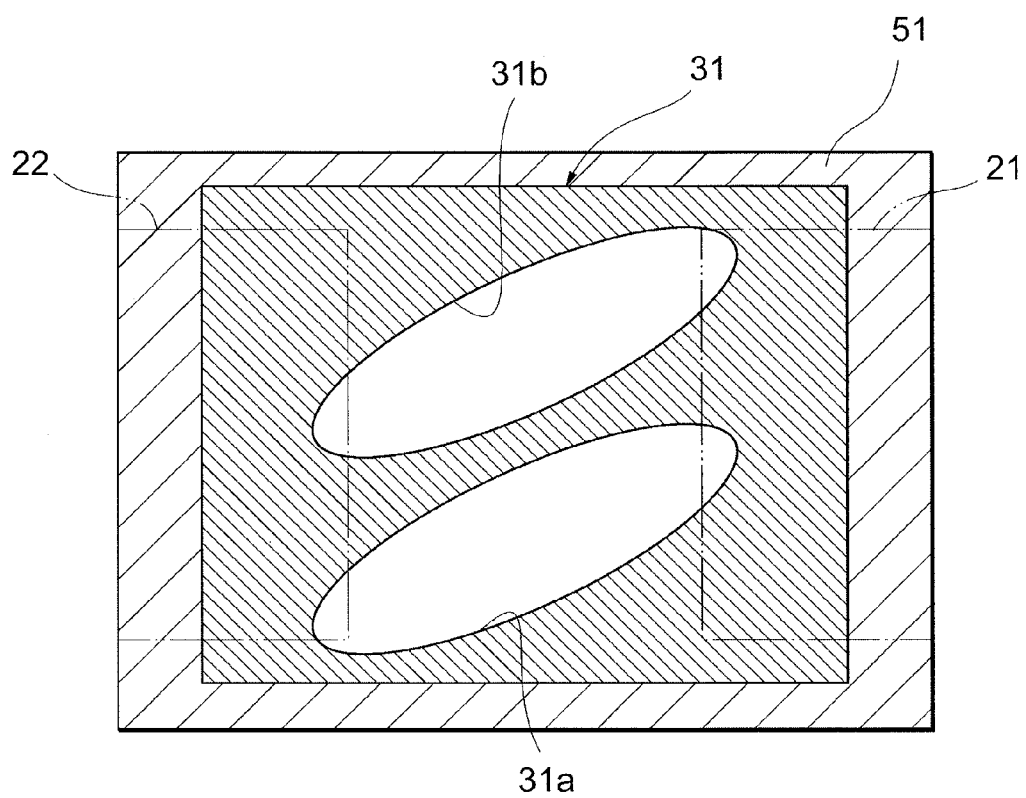
FIG. 9 is a schematic sectional view showing a first modification.
Figure 10:
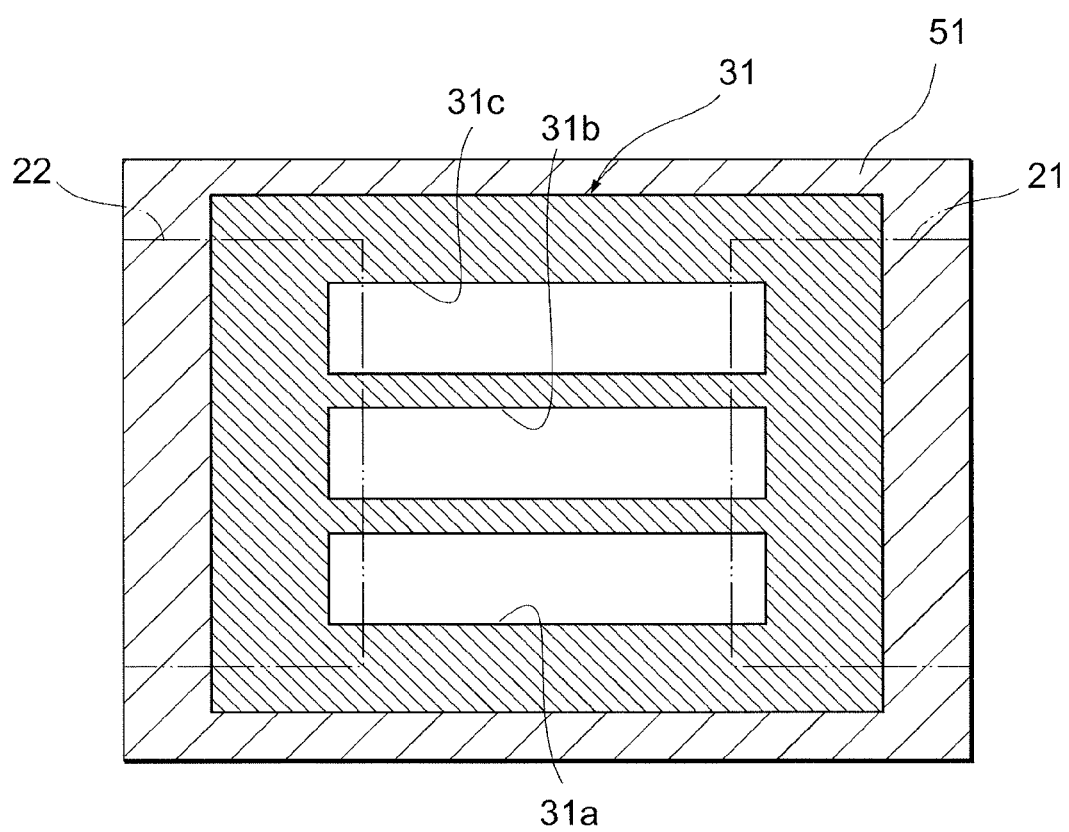
FIG. 10 is a schematic sectional view showing a second modification.
Figure 11:
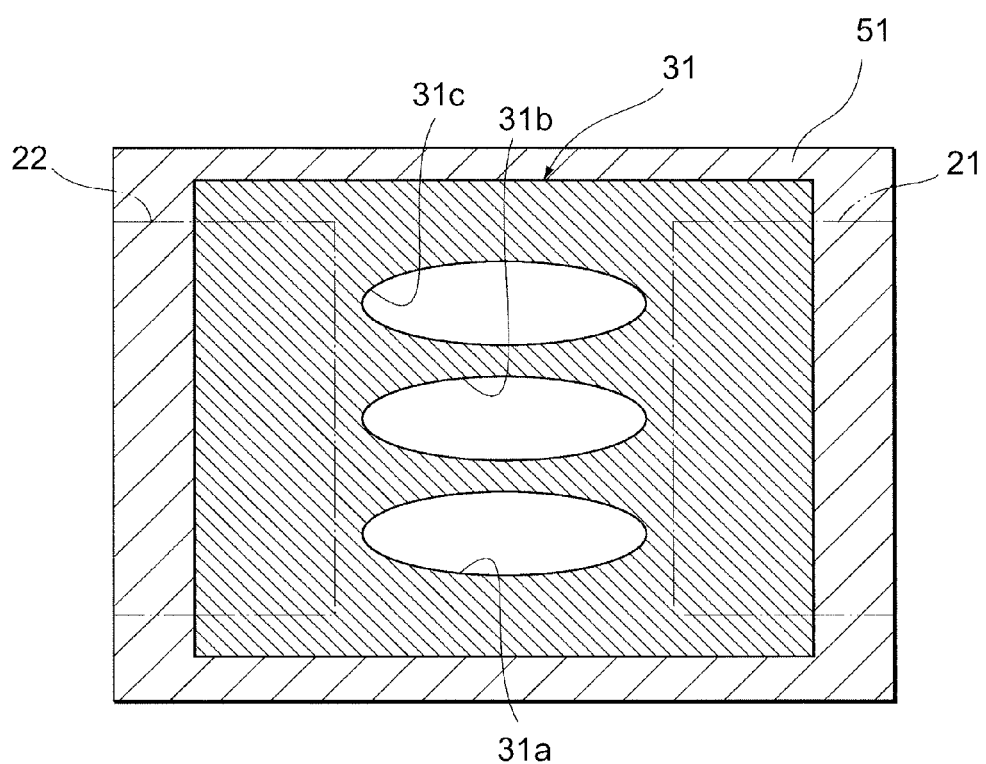
FIG. 11 is a schematic sectional view showing a third modification.
Figure 12:
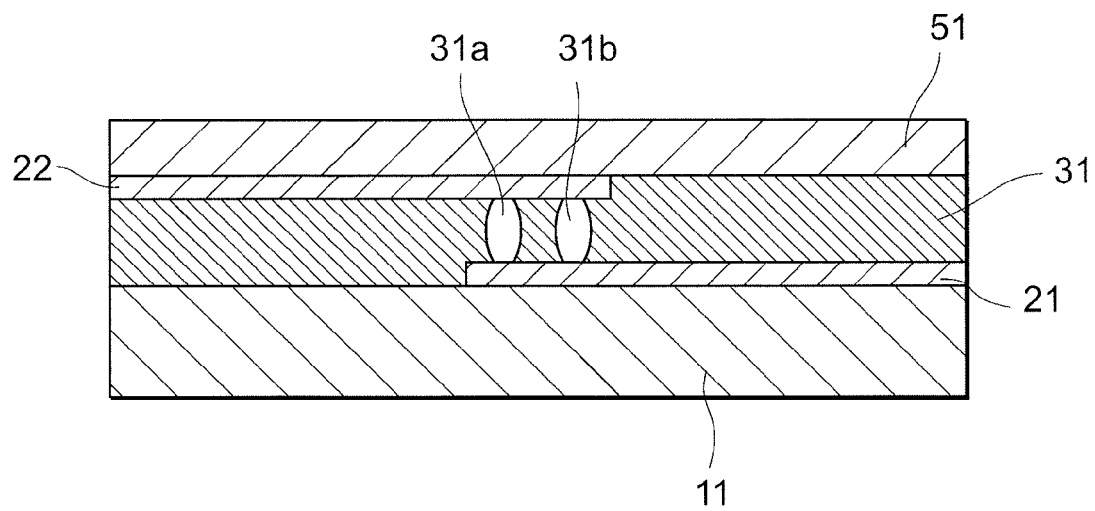
FIG. 12 is a schematic sectional view showing a fourth modification.

The present invention is not limited to the above embodiment and Examples, and various modifications can be made without departing from the spirit thereof. For example, the placement number, shape, size, and layout, and the like of the hollow sections 31a and 31b can be appropriately changed. Specifically, for example, as shown in FIG. 9, a mode in which hollow sections 31a and 31b are inclined against the direction of connecting electrodes 21 and 22 so as to extend along the direction of connecting the electrodes 21 and 22 is possible. In addition, as shown in FIG. 10, a mode in which three hollow sections 31a, 31b, and 31c are placed, and their shape is a prism shape is also possible. Further, as shown in FIG. 11, a mode in which the length of hollow sections 31a and 31b is shorter than a gap distance ΔG in the direction of connecting electrodes 21 and 22 is also possible. Alternatively, as shown in FIG. 12, a mode in which one electrode 21 is provided on an insulating substrate 11, and the other electrode 22 is provided on an insulating substrate 51 (11), and thus, the paired electrodes 21 and 22 are arranged away from and opposite each other is also possible.

INDUSTRIAL APPLICABILITY

As described above, the ESD protection device of the present invention not only has small electrostatic capacitance and low discharge start voltage, but also the occurrence of short-circuiting between the electrodes is inhibited, and the durability against repeated use is enhanced. Further, the ESD protection device of the present invention is excellent in heat resistance and weatherability and can also enhance productivity and economy. Therefore, the ESD protection device of the present invention can be widely and effectively utilized for electronic and electric devices including the ESD protection device, and various apparatuses, facilities, systems, and the like including the electronic and electric devices.

REFERENCE SIGNS LIST

11 . . . insulating substrate, 11a . . . insulating surface, 21, 22 . . . electrode, 31 . . . discharge induction section, 31a to 31c . . . hollow section, 32 . . . insulating inorganic material, 33 . . . conductive inorganic material, 34 . . . micropore, 41 . . . terminal electrode, 51 . . . insulating protection layer, 100 . . . ESD protection device, ΔG . . . gap distance, ΔM . . . the length of the hollow sections 31a and 31b in the direction of connecting the electrodes 21 and 22, ΔL . . . the length of the discharge induction section 31, C . . . the center line of the electrodes 21 and 22.

The invention claimed is:
1. An ESD protection device comprising an insulating substrate, electrodes arranged on the insulating substrate away from and opposite each other, and a discharge induction section located between the electrodes, wherein
the discharge induction section is composed of a porous body in which micropores are discontinuously scattered, and has a hollow structure having at least one or more hollow sections.

2. The ESD protection device according to claim 1, wherein
the hollow section is formed so as to extend along a direction of connecting the electrodes.

3. The ESD protection device according to claim 1, wherein
in the discharge induction section, a length of the hollow section in the direction of connecting the electrodes is 0.5 times a gap distance AG between the electrodes to less than discharge induction section length.

4. The ESD protection device according to claim 1, wherein
the electrodes are exposed in the hollow section.

5. The ESD protection device according to claim 1, wherein
the discharge induction section has a plurality of the hollow sections.

6. The ESD protection device according to claim 1, wherein
the porous body is a composite in which at least one type of conductive inorganic material is discontinuously dispersed in a matrix of at least one type of insulating inorganic material.

7. The ESD protection device according to claim 6, wherein
the insulating inorganic material is composed mainly of one type selected from the group consisting of $Al_2O_3$, SrO, CaO, BaO, $TiO_2$, $SiO_2$, ZnO, $In_2O_3$, NiO, CoO, $SnO_2$, $V_2O_5$, CuO, MgO, $ZrO_2$, AlN, BN, and SiC.

8. The ESD protection device according to claim 6, wherein
the conductive inorganic material is composed mainly of one type of metal selected from the group consisting of C, Ni, Al, Fe, Cu, Ti, Cr, Au, Ag, Pd, and Pt, or a metal compound thereof.

9. The ESD protection device according to claim 6, wherein
the discharge induction section has a thickness of 10 nm or more and less than device thickness.

10. The ESD protection device according claim 1, wherein
the discharge induction section is a fired body obtained by firing a mixture at least comprising at least one type of insulating inorganic material, at least one type of conductive inorganic material, and at least one type of resin particles, and removing the resin particles.

11. The ESD protection device according to claim 1, wherein
the discharge induction section is formed of a material that is different from a material the insulating substrate is formed of, the material of the discharge induction section embedding the micropores and including a conductive inorganic material.

12. The ESD protection device according to claim 1, wherein
the micropores have a size between $0.1\mu$ and $5\mu$.

* * * * *